June 26, 1945.  E. R. BERGMANN  2,379,337
SHAKER CONVEYER
Filed March 24, 1944  3 Sheets-Sheet 1

INVENTOR
Ernst R Bergmann
Clarence F. Poole
ATTORNEY

June 26, 1945.   E. R. BERGMANN   2,379,337
SHAKER CONVEYER
Filed March 24, 1944   3 Sheets-Sheet 2
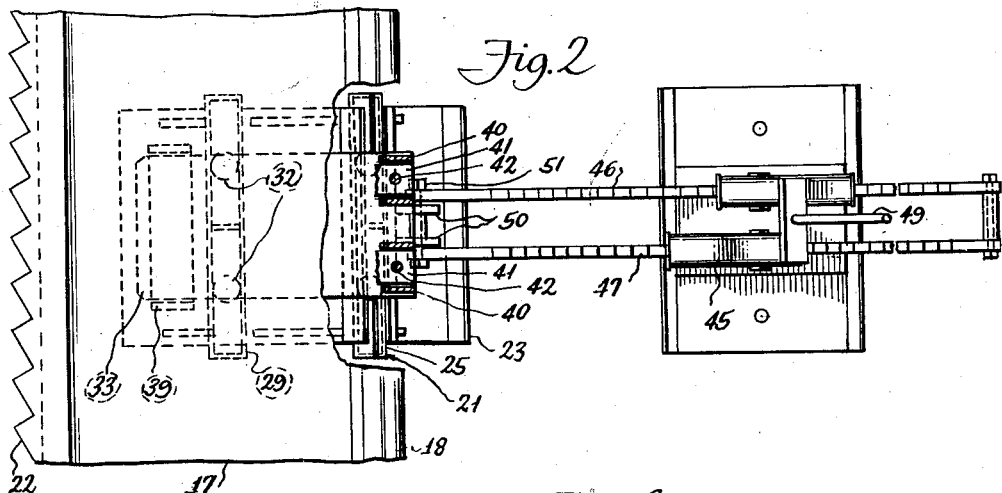
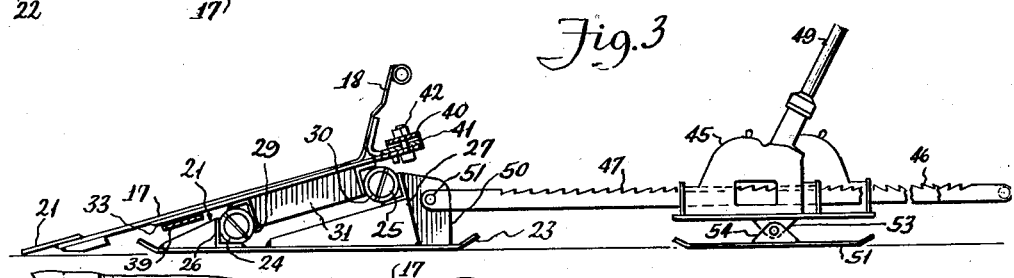
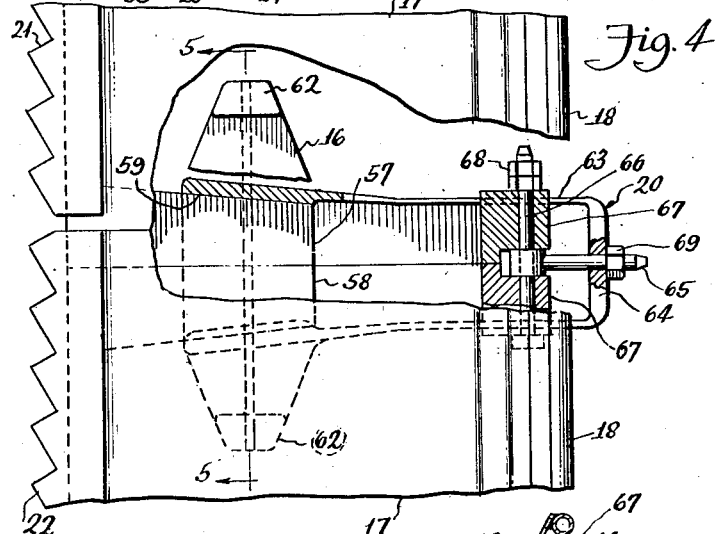
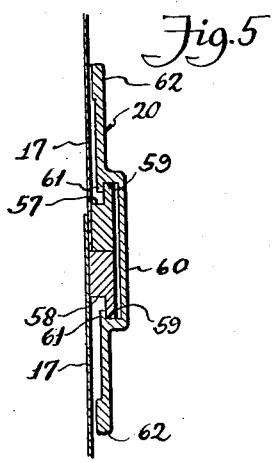
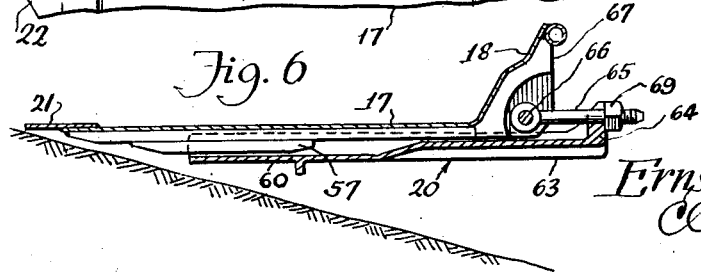
INVENTOR
Ernst R. Bergmann
Clarence T. Poole
ATTORNEY

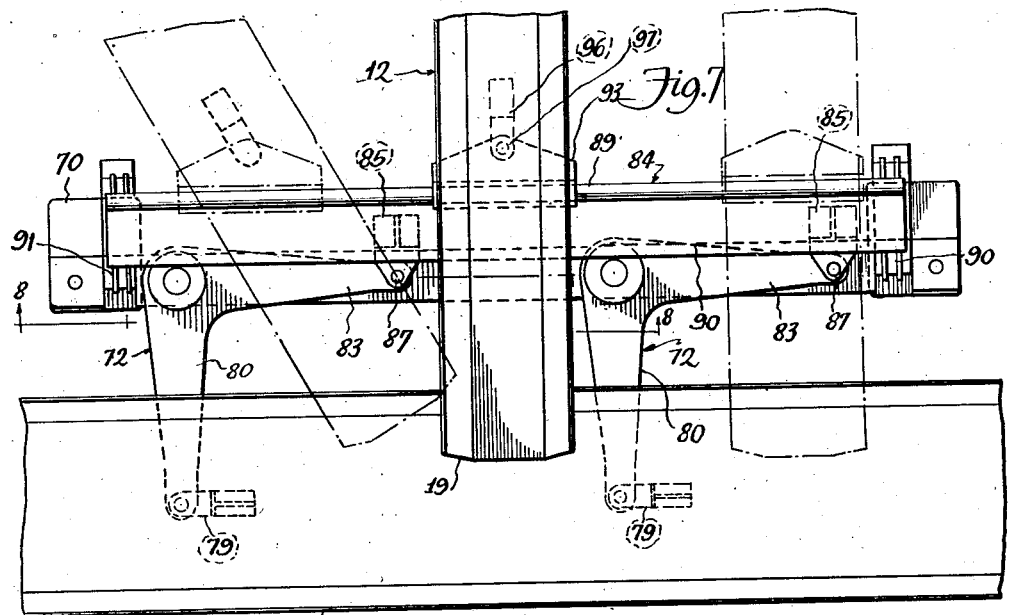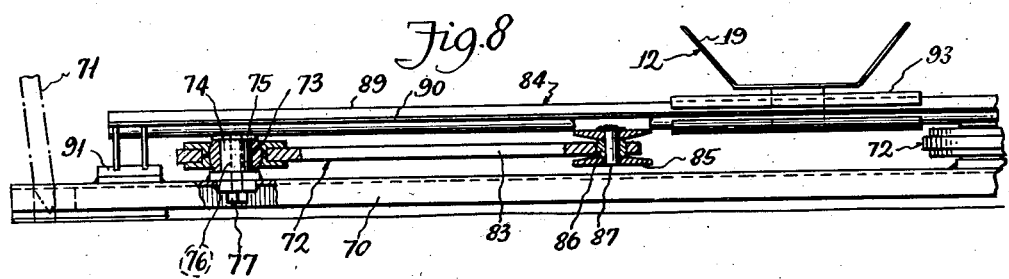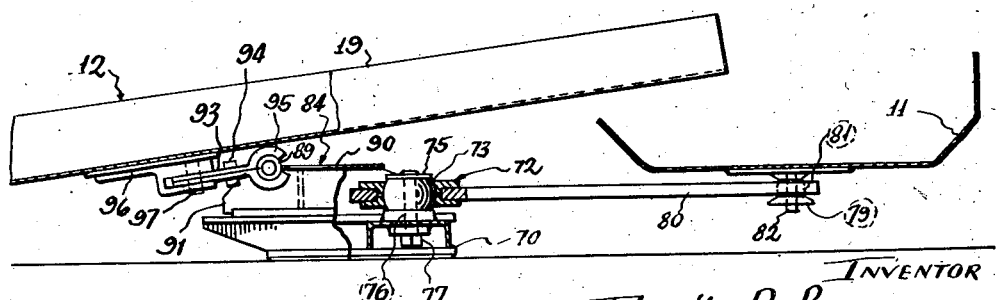

Patented June 26, 1945

2,379,337

UNITED STATES PATENT OFFICE 2,379,337

SHAKER CONVEYER

Ernst R. Bergmann, Chicago, Ill., assignor to Goodman Manufacturing Company, Chicago, Ill., a corporation of Illinois Application March 24, 1944, Serial No. 527,924

8 Claims. (Cl. 198—220)

This invention relates to improvements in shaker conveyers, and more particularly relates to a novel form of shaker conveyer loading device for picking up mined material such as coal from the working place of a mine.

Among the objects of my invention are to provide a novel form of shaker conveyer loading device for continuously loading mined material from the working place of a mine, which includes a shaker conveyer extending into the working place and a loading pan extending at an angle to said shaker conveyer, substantially parallel to the working place, together with a novel form of drive means from the shaker conveyer to the loading pan, permitting the loading pan to be advanced to load out the mined material without advancing the shaker conveyer.

A more specific object of my invention is to provide a drive connection from a bell crank, driven from the shaker conveyer trough line, to a loading pan disposed at an angle to the trough line, which drive connection is so arranged as to drive the trough line while it is being advanced into the material being loaded without advancing the trough line or bell crank.

The device of my present invention is somewhat similar to that shown in Patent No. 2,314,009 which issued to T. F. McCarthy March 16, 1943, but differs therefrom in the details of construction thereof and in the drive connection from the trough line to the loading pan.

Other objects of my invention will appear from time to time as the following specification proceeds and with reference to the accompanying drawings wherein:

Figure 2 is an enlarged detail plan view of a loading pan with certain parts broken away and certain other parts shown in substantially horizontal section, in order to illustrate certain details of the anti-friction mounting and advancing means for the loading pan;

Figure 3 is an end view of the loading pan drawn to substantially the same scale as Figure 2 and showing certain details of the support and advancing means for the loading pan, which are not shown in Figure 2;

Figure 4 is an enlarged detail plan view of adjacent ends of two sections of the loading pan with certain parts shown in substantially horizontal section in order to more clearly illustrate certain details of the means for connecting said sections together;

Figure 5 is a fragmentary sectional view taken substantially alone line 5—5 of Figure 4;

Figure 6 is a transverse sectional view showing certain details of the connecting means for the sections of the loading pan, not shown in Figures 4 and 5;

Figure 7 is an enlarged detail fragmentary plan view showing certain details of the means for driving the loading pan from the shaker conveyer trough line;

Figure 8 is an enlarged sectional view taken substantially along line 8—8 of Figure 7; and Figure 9 is a fragmentary sectional view taken transversely of the conveyer trough line and showing certain details of the drive means for the loading pan not shown in Figures 7 and 8.

Figure 1:
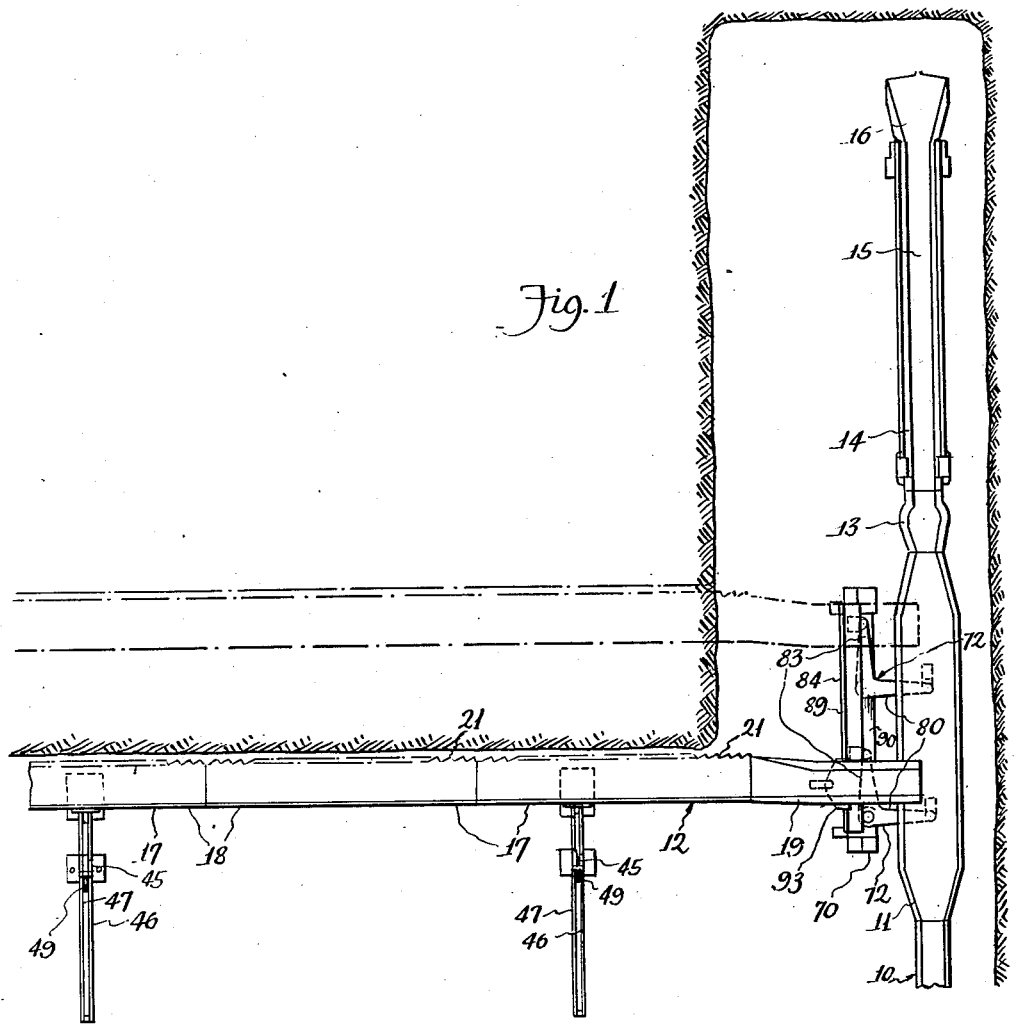
Figure 1 is a diagrammatic plan view of the working place of a mine with a loading device constructed in accordance with my invention shown in position for loading along the working face.

In the embodiment of my invention illustrated in the drawings, the inby end of a shaker conveyer trough line 10 is shown as being extended into the working place of a mine. Said trough line includes a widened material receiving trough 11 adapted to receive material from a face loading pan 12, herein shown as extending at substantially right angles with respect thereto and driven therefrom in a manner which will hereinafter more clearly appear as this specification proceeds.

A swivel 13 is connected to the inby end of the material receiving trough 11 and has a reciprocating trough 14 connected to the receiving end thereof. An extensible trough 15 having a material gathering shovel 16 on its forward end may be mounted on said reciprocating trough for extensible or retractible movement with respect thereto. Said extensible trough and shovel may be extensibly or retractibly moved with respect to said reciprocating trough to load out a passageway advanced along one side of the working face, to accommodate the receiving trough 11 and the drive means for the loading pan 12, by means of a feeder head such as is illustrated in my prior Patent No. 2,186,472, dated Jan. 9, 1940, and not herein shown or described since it is no part of my present invention.

The face loading pan 12 is herein shown as being of a sectional construction including a plurality of inclined relatively flat pan sections 17, 17 having a rear retaining side 18 adapted to retain material thereon during reciprocable movement of said loading pan. Said pan sections communicate with and are connected to a discharge trough section 19 arranged in cascade relation with respect to the receiving trough 11 for discharging the mined material therein. Connecting means 20, 20 are provided to connect said pan sections together and to connect said end pan section with said discharge trough section. Said pan sections of said face loading pan are inclined at an angle with respect to the ground and are supported on angularly disposed guide frames 21, 21 in such a manner that advance serrated edges 22, 22 thereof will be closely adjacent and in many cases in slidable engagement with the ground, so said pan sections can be forced under the broken down material, for loading.

Each guide frame 21 includes a shoe 23 mounted on the ground for slidable movement with respect thereto and having a pair of parallel spaced semi-cylindrical guide members 24, 25, closed at their ends, mounted thereon and extending longitudinally of said face loading pan. The guide member 24 is mounted between the legs of an angle 26 suitably secured to the upper surface of said shoe, as by welding, while the guide member 25 is spaced upwardly from said guide member 24 and is suitably mounted between the legs of a similar angle supported on a support bracket 27, which is secured to and extends upwardly from the top of said shoe. Said guide members thus form an inclined guide frame for an upper frame 31. The guide members 24 and 25 are adapted to register with similar guide members 29 and 30 of the upper frame 31. Balls 32, 32 are interposed between said guide members 24, 29 and 25, 30, and form an inclined anti-friction support and guide means for said upper frame member on the shoe 23. Said upper frame member 31 has a flat plate 33 mounted on its upper side, upon which the undersurface of a pan section 17 is adapted to rest.

The upper frame member 31 of the guide frame 21 is secured to a pan section 17 of the face loading pan by means of an elongated substantially U-shaped strap 39, which is secured to the bottom of said face loading pan at its ends, and is adapted to receive the advance end of the plate 33. A pair of parallel spaced U-shaped straps 40, 40 are secured to the upper side of said flat plate, adjacent its outer or rear end, which straps are adapted to receive spaced tongues 41, 41, secured to and projecting rearwardly from the retaining wall 18 of said pan section. Suitable bolts 42, 42 are adapted to extend through said straps, tongues and plate, to detachably secure said upper frame member of said ball frame to said face loading pan.

A plurality of ratchet type jacks 45, 45, suitably held in position on the ground, are herein shown as being provided to advance the face loading pan 12 into and retract said loading pan from the material it is desired to load. Said jacks each include a pair of connected parallel spaced, oppositely facing ratchet bars 46 and 47, one of said ratchet bars being positioned to advance said face loading pan, when a dog (not shown) is engaged therewith by rocking movement of a jack handle 49, and the other of said ratchet bars being positioned to retract said loading pan when another dog (not shown) is positioned to be engaged therewith, upon rocking movement of said jack handle. The pawl mechanism actuated by the jack handle 49 and the selective control means therefor, to cause advance or retractible movement of said loading pan, may be of any well known form, and is not herein shown since it is no part of my present invention. The ratchet bars 46 and 47 are connected at their forward ends to a bracket 50 on the shoe 23 by means of a pivotal pin 51 extending through said racks and bracket. Said bracket is secured to and projects upwardly from the shoe 23, adjacent the rear end of the upper angle 26, and forms a reinforcing means therefor.

The ratchet jack 45 is provided with a pair of spaced depending ears 53 pivotally connected to ears 54 projecting upwardly from a base plate 55, to permit operation of the jack where the mine bottom is irregular. Said base plate is adapted to be held in a stationary position on the ground by means of a plurality of jacks (not shown), adapted to be interposed between said base plate and the mine roof.

The connecting means 20, 20, for connecting adjacent ends of the pan sections 17, 17 together, each include a pair of abutting members 57 and 58 secured to adjacent ends of said pan sections. Said abutting members each have an inner flat abutting surface and an outer inclined wedge-shaped surface. Said outer inclined surfaces are adapted to be engaged by oppositely inclined surfaces 59, 59 of a clamping member 60. The outer wedge-shaped surfaces of said abutting members are spaced downwardly from the bottom of the pans 17, 17, to form grooves extending between said surfaces and the bottoms of said pans. Tongues 61, 61 projecting inwardly from said inclined surfaces 59, 59 of said clamping member are adapted to extend within said grooves, to retain said clamping member thereon. The clamping member 60 is provided with a pair of spaced engaging ends 62, 62 extending in opposite directions from the forward end thereof. Said ends are adapted to engage the bottoms of adjacent pan sections 17, 17, to stabilize said clamping member and limit movement of said pan sections with respect to each other. Said clamping member has an outer portion 63 extending outwardly beyond the retaining edge of the loading pans, which has an upright apertured portion 64, adapted to receive an eyebolt 65. The eye of said eyebolt is pivotally connected to a bolt 66 extending through abutting connecting lugs 67, 67, secured to the rear or outer sides of the retaining walls 18, 18 of adjacent ends of the pan sections 17, 17. Lock nuts 68, 68 on said bolt 66 serve to aid in holding said loading pans together. A nut 69 threaded on the end of said eyebolt abuts the outer side of said upright apertured portion 64 and serves to move said connecting member in a direction to wedge the troughs together, as said nut is moved along said eyebolt towards the pan sections 17, 17.

Referring now in particular to the means for driving the loading pan 12 from the trough line 10, permitting said loading pan to be advanced into the material it is desired to load without advancing the drive means therefor, an elongated base 70, extending in substantially parallel relation with respect to the trough line 10, is provided. Said base is adapted to be held in a stationary position on the ground by means of suitable jacks 71, 71 adapted to be interposed between opposite ends of said base and the mine roof. Two parallel spaced bell cranks 72, 72 are pivotally mounted on said base on semi-ball-shaped bearing members 73, 73. Each of said ball-shaped bearing members is mounted on a sleeve 74, held in position on said base by means of a collar 75, herein shown as being welded to the upper end of a bolt 76, extending through said sleeve and base. A nut 77 threaded on the lower end of said bolt is provided to hold said sleeve and bearing member in position on said base. A pair of spaced connecting members 79, 79 depend from the bottom of the material receiving trough 11 and are each connected to one lever arm 80 of an associated bell crank 72. A semi-ball-shaped bearing member 81, mounted in said connecting member on a pin 82, forms a bearing for said lever arm of said bell crank. The bell cranks 72, 72 are thus rocked together upon reciprocable movement of the shaker conveyer.

Another lever arm 83 of each bell crank 72 is pivotally connected at its end to a driving bar 84, slidably mounted on the base 70, for reciprocable movement therealong in a direction transverse to the direction of reciprocating movement of the trough line 10. Said driving bar is provided with a pair of spaced connecting members 85, 85 extending therefrom towards the receiving trough 11, each of which connecting members has a semi-ball-shaped bearing member 86 mounted therein on a pivotal pin 87. The free end of the lever arm 83 is journaled on said bearing member so as to reciprocably move said driving bar in a direction transverse to the direction of reciprocation of the trough line 10.

The driving bar 84 includes an advance hollow tube 89 and a plate 90 secured to and extending along the side of said tube adjacent the receiving pan 11, to form a reinforcing means for said tube. Opposite ends of said driving bar are slidably supported on the base 70 on shoes 91, 91, secured to opposite ends of said plate, so as to space said driving bar above said base and form a slidable support for said driving bar on said base.

The drive connection from the driving bar 84 to the face loading pan 12 includes a drive member 93 mounted on the tube 89, for slidable movement therealong. Said drive member, as herein shown, is in two halves secured together by nuts and bolts 94, 94, which hold a rear substantially C-shaped portion 95 of said drive member in slidable engagement with said tube, so said C-shaped portion will partially encircle the tube 89 and be slidably movable therealong. A connecting member 96 is secured to and depends from the discharge trough section 19 of said loading pan and is adapted to have said drive member extend within a slotted portion thereof. A pivotal pin 97 is provided to pivotally connect said drive member to said connecting member.

It may be seen from the foregoing that reciprocation of the shaker conveyer trough line 10 will reciprocably move the loading pan 12 in a direction transverse thereto, and that said loading pan may be advanced into or retracted from the material it is desired to load by means of the ratchet jacks 45, 45, during reciprocation of the trough line, without changing the position of the base 70 having the bell cranks 72, 72 mounted thereon. Thus the only time it is necessary to move said base and bell cranks is when the face has been completely loaded out and it is desired to extend the entire trough line 10 by inserting an additional trough therein.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a face loading apparatus, a shaker conveyer trough line adapted to be extended into a working place, a face loading pan adapted to extend at an angle to said trough line in substantially parallel relation with respect to a working face, for loading material from the working face onto said trough line, and means for reciprocably driving said face loading pan and permitting it to be advanced into the working face as the loading operation progresses without advancing said drive means, including a base adapted to be held in a stationary position on the ground, a bell crank, a drive connection from said trough line to one arm of said bell crank, a driving bar extending parallel to said trough line and slidably mounted on said base for movement transverse to said trough line, a drive connection from said bell crank to said driving bar, for reciprocably driving said bar, and means slidably movable along said driving bar, for operatively connecting said driving bar to said loading pan, for driving said loading pan and permitting said loading pan to be advanced into the broken down material, while said base and bell crank are held in position on the ground.

2. In a face loading apparatus, a shaker conveyer trough line adapted to be extended into a working place, a face loading pan adapted to extend at an angle to said trough line in substantially parallel relation with respect to a working face, for loading material from the working face onto said trough line, and means for reciprocably driving said face loading pan and permitting it to be advanced into the working face as the loading operation progresses without advancing said drive means, including a base adapted to be held in a stationary position on the ground, a bell crank, a drive connection from said trough line to one arm of said bell crank, a longitudinally extending driving bar slidably mounted on said base, a drive connection from said bell crank to said driving bar, for driving said bar along said base in a direction transverse to the direction of reciprocation of said trough line, a drive connection between said bar and said loading pan including a drive member slidably movable along said bar, and a pivotal connection between said drive member and said loading pan, for driving said loading pan from said driving bar when in various positions therealong and when in various angular positions with respect thereto.

3. In a face loading apparatus, a shaker conveyer trough line adapted to be extended into a working place, a face loading pan adapted to extend at an angle to said trough line in substantially parallel relation with respect to a working face, for loading material from the working face onto said trough line, and means for reciprocably driving said face loading pan and permitting it to be advanced into the working face as the loading operation progresses without advancing said drive means, including a base adapted to be held in a stationary position on the ground, a pair of parallel spaced bell cranks pivotally mounted on said base, drive connections from said trough line to one arm of each of said bell cranks, for rocking said bell cranks together, a driving bar extending parallel to said trough line and slidably mounted on said base, drive connections from said bell cranks to said driving bar at spaced apart points, for reciprocably driving said bar in a direction transverse to said trough line, and means slidably movable along said driving bar, for driving said loading pan from said driving bar and permitting said loading pan to be advanced into the working face and to be reciprocably driven from said driving bar, while said base remains stationary on the ground.

4. In a face loading apparatus, a shaker conveyer trough line adapted to be extended into a working place, a face loading pan adapted to extend at an angle to said trough line in substantially parallel relation with respect to the working face, for loading material from the working face onto said trough line, and means for reciprocably driving said face loading pan and permitting it to be advanced into the working face as the loading operation progresses without advancing said drive means, including a base adapted to be held in a stationary position on the ground, a pair of parallel spaced bell cranks pivotally mounted on said base, drive connections from said trough line to one arm of each of said bell cranks, for rocking said bell cranks together, a driving bar extending parallel to said trough line and slidably mounted on said base, drive connections from said bell cranks to said driving bar at spaced apart points, for reciprocably driving said bar in a direction transverse to said trough line, and means for driving said loading pan from said driving bar and permitting said loading pan to be advanced into the working face and reciprocably driven from said driving bar, while said base remains stationary on the ground, including a drive member having driving connection with said loading pan and mounted on said driving bar for slidable movement therealong.

5. In a face loading apparatus, a shaker conveyer trough line adapted to be extended into a working place, a face loading pan adapted to extend at an angle with respect to said trough line in substantially parallel relation with respect to the working face, for loading material from the working face onto said trough line, and means for reciprocably driving said face loading pan and permitting it to be advanced into the working face as the loading operation progresses without advancing said drive means including a base adapted to be held in a stationary position on the ground, a pair of parallel spaced bell cranks pivotally mounted on said base, drive connections from said trough line to one arm of each of said bell cranks, for rocking said bell cranks together, a driving bar extending parallel to said trough line and slidably mounted on said base, drive connections from said bell cranks to said driving bar at spaced apart points, for reciprocably driving said bar in a direction transverse to said trough line, and means for driving said loading pan from said driving bar and permitting said loading pan to be advanced parallel to the working face and to be moved in various angular relations with respect to said trough line, while said base remains stationary on the ground, including a drive member mounted on said driving bar for slidable movement therealong, and a pivotal drive connection between said drive member and said loading pan.

6. In a face loading apparatus, a shaker conveyer trough line extending into a working place, a face loading pan arranged to extend in substantially parallel relation with respect to a working face at an angle with respect to said trough line, for loading material from the working face onto said trough line, and a reciprocable drive connection from said trough line to said face loading pan including a base, a rocking member pivotally mounted on said base, means for driving said rocking member from said shaker conveyer trough line, a driving bar slidably mounted on said base, a drive connection from said rocking member to said driving bar for driving said driving bar in a direction transversely of said trough line, and a supporting and driving connection between said driving bar and the discharge end of said loading pan, said supporting and drive connection being adjustable along said driving bar to permit said loading pan to be advanced along said bar and driven from said bar in its several advanced positions, without advancing said base and said driving bar.

7. In a face loading apparatus, a shaker conveyer trough line extending into a working place, a face loading pan arranged to extend in substantially parallel relation with respect to a working face at an angle with respect to said trough line, for loading material from the working face onto said trough line, and a reciprocable drive connection from said trough line to said face loading pan including a base, a rocking member pivotally mounted on said base, means for driving said rocking member from said shaker conveyer trough line, a driving bar slidably mounted on said base, a drive connection from said rocking member to said driving bar for driving said driving bar in a direction transversely of said trough line, and a supporting and driving connection between said driving bar and the discharge end of said loading pan including a drive member mounted on said bar for adjustable movement therealong to permit said loading pan to be advanced along said bar and to be driven by said bar in its several advanced positions without advancing said base and said driving bar, and a pivotal supporting and drive connection between said drive member and the discharge end of said loading pan, permitting adjustment of said loading pan with respect to said driving bar and trough line about an upright axis.

8. In a face loading apparatus, a shaker conveyer trough line extending into a working place, a face loading pan arranged to extend in substantially parallel relation with respect to a working face at an angle with respect to said trough line, for loading material from the working face onto said trough line, and a reciprocable drive connection from said trough line to said face loading pan including a base, two rocking members pivotally mounted on said base, drive connections from said trough line to said rocking members for driving said rocking members together, a driving bar slidably mounted on said base, drive connections from said rocking members to said driving bar, for reciprocably driving said bar in a direction transverse to said trough line, and a supporting and driving connection between said driving bar and the discharge end of said loading pan, permitting said loading pan to be advanced along said bar and driven from said bar in its several advanced positions, without advancing said base and said driving bar.

ERNST R. BERGMANN.